US012762882B2

(12) United States Patent
Rebecq et al.

(10) Patent No.: US 12,762,882 B2
(45) Date of Patent: Oct. 13, 2026

(54) READING ORDER WITH POINTER TRANSFORMER NETWORKS

(71) Applicant: Google LLC, Mountain View, CA (US)

(72) Inventors: Henri Rebecq, Zurich (CH); Federico Tombari, Zug (CH); Diego Martin Arroyo, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 18/686,233

(22) PCT Filed: Aug. 25, 2022

(86) PCT No.: PCT/US2022/075454
§ 371 (c)(1),
(2) Date: Feb. 23, 2024

(87) PCT Pub. No.: WO2023/034715
PCT Pub. Date: Mar. 9, 2023

(65) Prior Publication Data
US 2024/0257550 A1 Aug. 1, 2024

Related U.S. Application Data

(60) Provisional application No. 63/260,831, filed on Sep. 1, 2021.

(51) Int. Cl.
*G06V 30/416* (2022.01)
*G06V 10/44* (2022.01)
(Continued)

(52) U.S. Cl.
CPC ............ *G06V 30/416* (2022.01); *G06V 10/44* (2022.01); *G06V 10/82* (2022.01); *G06V 30/412* (2022.01)

(58) Field of Classification Search
CPC .... G06V 30/414; G06V 10/82; G06V 30/416; G06V 30/10; G06V 30/413; G06V 30/40;
(Continued)

(56) References Cited

U.S. PATENT DOCUMENTS 10,706,322 B1 7/2020 Yang et al.
2004/0114813 A1 * 6/2004 Boliek ................. G06V 30/414
375/E7.199
(Continued)

FOREIGN PATENT DOCUMENTS

CN 110192206 A 8/2019
CN 112215223 A 1/2021
(Continued)

OTHER PUBLICATIONS

Zilong Wang, Yiheng Xu, Lei Cui, Jingbo Shang, Furu Wei LayoutReader: Pre-training of Text and Layout for Reading Order Detection, arXiv:2108.11591v2 [cs.CL] 27 Aug (Year: 2021).*
(Continued)

*Primary Examiner* — Alex Kok S Liew
(74) *Attorney, Agent, or Firm* — BRAKE HUGHES BELLERMANN LLP

(57) ABSTRACT

A method including receiving an image representing a document including a plurality of layout components, identifying textual information associated with the plurality of layout components, identifying visual information associated with the plurality of layout components, combining the textual information with the visual information, and predicting a reading order of the plurality of layout components based on the combined textual information and visual information using a self-attention encoder/decoder.

20 Claims, 8 Drawing Sheets

(51) Int. Cl.
*G06V 10/82* (2022.01)
*G06V 30/412* (2022.01)

(58) Field of Classification Search
CPC ........... G06V 30/19173; G06V 30/412; G06V 30/418; G06V 10/454; G06V 20/62; G06V 20/46; G06V 30/18057; G06V 10/25; G06V 10/762; G06V 10/95; G06V 10/40; G06V 10/44; G06V 10/768; G06V 10/7715; G06V 20/20; G06V 20/52; G06V 20/54; G06V 20/63; G06V 2201/08; G06F 40/106; G06F 40/30; G06F 40/295; G06F 16/93; G06F 40/169; G06F 40/186; G06F 40/205; G06F 40/131; G06F 16/248; G06F 40/117; G06F 40/284; G06F 40/289; G06F 16/2457; G06F 18/24133; G06F 18/214; G06F 40/279; G06F 16/9577; G06F 16/906; G06F 18/217; G06F 40/177; G06F 40/151; G06N 3/0464; G06N 3/09; G06N 3/0455; G06N 3/0895; G06N 3/045; G06N 3/08; G06N 20/00; G06N 3/088; G06N 3/082; G06N 3/091
See application file for complete search history.

(56) References Cited

U.S. PATENT DOCUMENTS

2018/0267956 A1 9/2018 Chang et al.
2021/0027770 A1* 1/2021 Olabiyi .................... G06F 40/30
2021/0232773 A1* 7/2021 Wang ..................... G06F 40/284

FOREIGN PATENT DOCUMENTS

CN 112487786 A 3/2021
CN 112801010 A 5/2021
CN 113672716 A 11/2021
CN 114218889 A 3/2022
CN 114693905 A 7/2022
JP 2003288334 A 10/2003
JP 2005043990 A 2/2005

OTHER PUBLICATIONS

Maryem Rhanoui, Mounia Mikram, Siham Yousfi, and Soukaina Barzali, A CNN-BiLSTM Model for Document-Level Sentiment Analysis, Machine Learning Knowledge. Extraction, MDPI (Year: 2019).*

Office Action for Chinese Application No. 2024-513770 (with English translation), mailed May 13, 2025, 5 pages.

Vaswani, et al., “Attention Is All You Need”, NIPS 2017, Dec. 6, 2017, 15 pages.

International Search Report and Written Opinion for PCT Application No. PCT/US/2022/075454, mailed on Nov. 18, 2022, 12 pages.

Arroyo, et al., “Variational Transformer Networks for Layout Generation”, 2021 IEEE/CVF Conference on Computer Vision and Pattern Recognition (CVPR), 2021, pp. 13637-13647.

Gandhi, “Deep Learning Next Step: Transformers and Attention Mechanism”, Aug. 2019, 8 pages.

Li, et al., “Text Compression-Aided Transformer Encoding”, IEEE Transactions on Pattern Analysis and Machine Intelligence, Mar. 2020, 18 pages.

Oh, et al., “Topic-Guided Coherence Modeling for Sentence Ordering By Preserving Global and Local Information”, Proceedings of the 2019 Conference on Empirical Methods in Natural Language Processing and the 9th International Joint Conference on Natural Language Processing, Nov. 3-7, 2019, pp. 2273-2283.

Powalski, et al., “Going Full-Tilt Boogie On Document Understanding With Text-Image-Layout Transformer”, arXiv:2102.09550v3, Jul. 12, 2021, 18 pages.

Wang, et al., “Layoutreader: Pre-Training of Text and Layout for Reading Order Detection”, arXiv:2108.11591v1, Aug. 26, 2021, 10 pages.

* cited by examiner

READING ORDER WITH POINTER TRANSFORMER NETWORKS

CROSS-REFERENCE TO RELATED APPLICATIONS

This application is a 35 U.S.C. § 371 National Phase Entry Application from PCT/US2022/075454, filed on Aug. 25, 2022, entitled "READING ORDER WITH POINTER TRANSFORMER NETWORKS", which claims the benefit of U.S. Provisional Application No. 63/260,831, filed on Sep. 1, 2021, entitled "DEEP READING ORDER WITH POINTER TRANSFORMER NETWORKS", the disclosures of which are incorporated by reference herein in their entirety.

FIELD

Implementations relate to detecting a reading order for a document, an image, and the like.

BACKGROUND

Reading order detection is a component of any text perception system. Reading order detection is a document image understanding task that aims at identifying a coherent ordered relation between layout components (e.g., paragraphs, summaries, images, and/or the like). Reading order detection algorithms often use a set of handcrafted reading order rules. However, these rules fail to provide satisfactory results on many examples (e.g., tables and receipts) and need to be carefully tuned or manually adapted to support different languages (e.g., right-to-left languages such as Japanese or Arabic). Reading order detection is a component that can be an element of many text-related applications (e.g., text copy/pasting, read-out-loud in text-to-speech, document translation, and/or the like).

SUMMARY

In an example implementation, a document reading order can be predicted using an encoder/decoder structure. The encoder can be configured to generate an embedding based on a sequence of the layout components in a first, random, order and the decoder can be configured to generate a sequence of the layout components in a second, reading, order based on the embedding.

In a general aspect, a device, a system, a non-transitory computer-readable medium (having stored thereon computer executable program code which can be executed on a computer system), and/or a method can perform a process with a method including receiving an image representing a document including a plurality of layout components, identifying textual information associated with the plurality of layout components, identifying visual information associated with the plurality of layout components, combining the textual information with the visual information, and predicting a reading order of the plurality of layout components based on the combined textual information and visual information using a self-attention encoder/decoder.

Implementations can include one or more of the following features, or any combination thereof.

For example, the identifying of the textual information includes extracting text-based data from the image. The extracting of the text-based data may include using a neural network configured to generate an embedding including the textual information. The neural network might be a pre-trained neural network that maps textual data to an embedding, and an array may include an element including the text-based data associated with each layout component of the plurality of layout components. The identifying of the visual information may include extracting visual-based data from the image. The extracting of the visual-based data may include using a neural network configured to generate an embedding including the visual information. The neural network might be a two-dimensional convolution operation, the embedding may include an array, and the array may include an element including the visual-based data associated with each of the plurality of layout components. The neural network might include a plurality of two-dimensional convolution operations, and the embedding might include an array including an element including the visual-based data associated with an associated layout component and the visual-based data associated with at least one additional layout component. Also, the textual information might be associated with a first embedding, the visual information might be associated with a second embedding, and the combining of the textual information with the visual information might include concatenating the first embedding with the second embedding. The self-attention encoder/decoder might include: a self-attention encoder configured to generate an embedding based on a first sequence associated with the plurality of layout components, the first sequence having a first order, and a self-attention decoder configured to generate a second sequence based on the embedding, the second sequence having a second order. The self-attention encoder/decoder might include a self-attention encoder configured to: weight relationships between pairs of elements in a set, and generate an embedding for the elements. The self-attention encoder/decoder might include a self-attention encoder configured to determine an influence of each element in an embedding based on the combined textual information and visual information. The self-attention encoder/decoder might include a self-attention decoder configured to operate as an auto-regressive inference. The self-attention encoder/decoder might include a self-attention decoder configured to auto-regressively predict a next layout component in the reading order associated with the plurality of layout components. The self-attention encoder/decoder might include a self-attention encoder and a self-attention decoder, and the self-attention decoder might be configured to perform a QKV outer product between elements of the self-attention encoder and inputs to the self-attention decoder.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1:
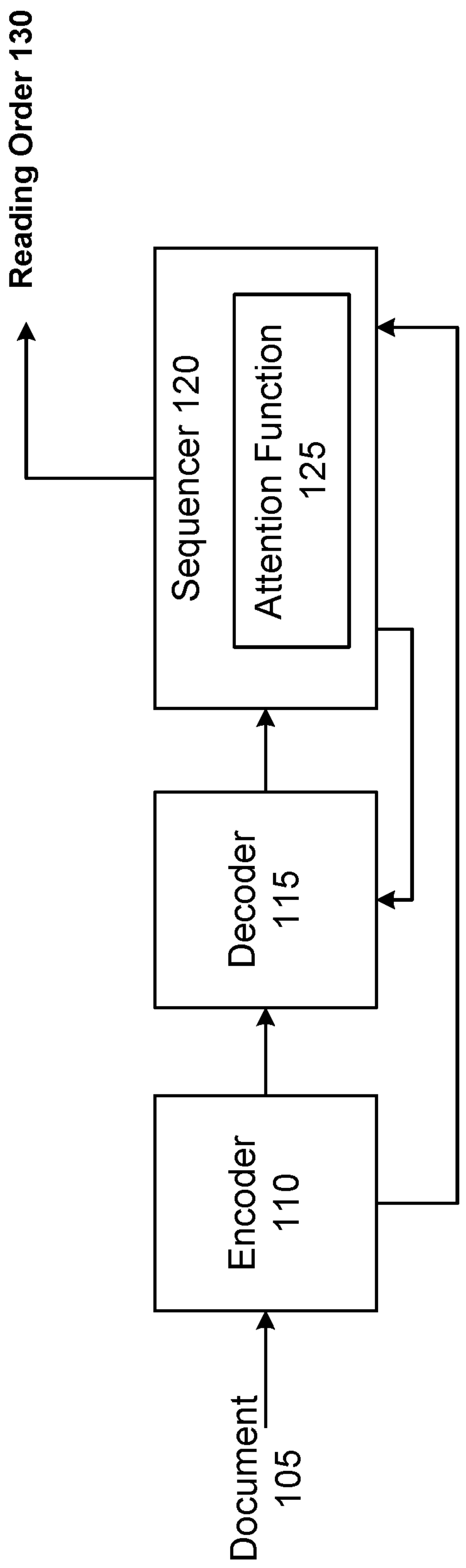
FIG. 1 illustrates a data flow block diagram according to an example implementation.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

Most approaches to reading order detection use manually developed rules-based algorithms, heuristics or learned models for reading order detection. One learned approach to extracting reading order from a set of layout components (e.g., paragraphs) uses a two-stage fashion. First, a naive Bayes classifier can be used to learn the probability of any two paragraphs being successive based on a set of manually designed descriptors (e.g., based on two paragraphs' locations, geometries, types and topological relationship). These probabilities are then converted into a reading order chain(s), by first finding the most likely initial paragraphs, and progressively growing the chain following the edges with highest probabilities. While these approaches can theoretically learn adaptive reading order rules, they require a manual feature engineering and hardcoded graph heuristics to convert the pairwise probabilities into a reading order. In addition, the learned model often works on one document structure or documents with a well-known structure, such as scientific articles.

Solving these reading order detection problems can include using a machine learned (ML) model to learn to predict the reading order of a set of layout components (e.g., paragraphs, titles, summaries, images, and the like) from labeled data. The reading order detection can include reordering a set of N input layout components {P1, P2, . . . . PN} in an unspecified order into a coherent reading order {PC (i)}i=1 . . . N where C(i)ε[1, N] where P represents a layout component and C represents an order with position (e.g., index) i. Implementations can model the reading order as a sequence-to-sequence problem where the elements of the output sequence (reordered layout components) should be sampled from the input sequence. Example implementations can use a modified pointer network to select a member of the input sequence as the output. A pointer network can use attention as a pointer to select a member of an input sequence as an output. Example implementations can use a Long Short-Term Memory (LSTM) backbone or an encoder-decoder transformer module.

This approach can generalize to variable size output sets, which can enable detecting or predicting a reading order when the number of paragraphs in the input sequence is unknown a priori. This technology can improve reading order accuracy compared to existing approaches that are based on manually designed rules and approaches that learn reading order rules.

In an example implementation, the reading order can be determined using an encoder/decoder structure. The encoder can be configured to generate an embedding based on a sequence of the layout components in a first order (e.g., an input sequence) and the decoder can be configured to generate a sequence of the layout components in a second order (e.g., an output sequence or a reading order sequence) based on the embedding. FIG. 1 can be used to describe a data flow (or information flow) in the encoder/decoder structure.

Figure 7:
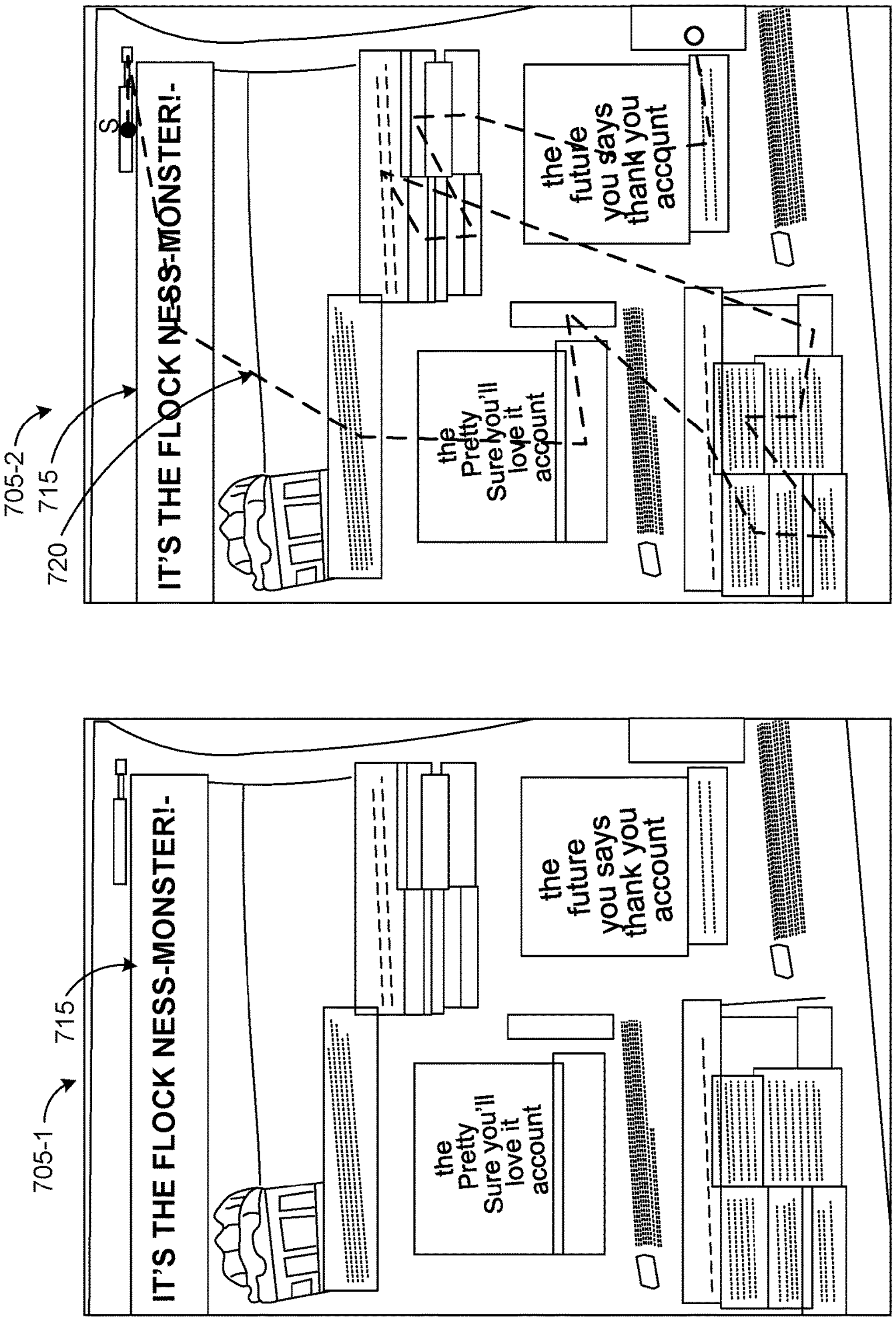
FIG. 7 pictorially illustrates a reading order according to an example implementation.

FIG. 1 illustrates a block diagram of a data flow diagram according to an example implementation. As shown in FIG. 1, the data flow can include a document 105 block, an encoder 110 block, a decoder 115 block, a sequencer 120 block, and an attention function 125 block. The document 105 can include any document that can be processed as an image. The document 105 can include at least one layout component (e.g., paragraphs, summaries, text, images, and/or the like). In an example implementation the document and/or image includes text and/or textual data. A reading order for the document 105 can be desired. Therefore, the document 105 can be referred to as an input to a system (e.g., a computing system, a system including at least a memory and a processor, and/or the like) configured to generate a reading order for the document 105. An example image 705-1-1, 705-1-2 representing the document 105 is shown in FIG. 7.

The encoder 110 can be configured to receive a portion of an image as a layout component. For example, image 705-1, 705-1-2 shows a plurality of layout components identified with boxes around each layout component. Layout component 715 is one example of a layout component shown in image 705-1, 705-1-2. The layout component(s) received by the encoder 110 can be initially sequenced in a random order. In other words, information associated with the layout component(s) can be stored in a data structure and labeled such that the layout component(s) are initially stored (sequenced) in a random order. The information and/or data structure can be encoded as an embedding. Therefore, the encoder 110 can be configured to generate an embedding including information (including the random order sequence) representing the layout component(s). An embedding can be used to represent discrete variables as continuous vectors. In other words, an embedding can be a mapping of a discrete (e.g., categorical) variable to a vector of continuous numbers.

The encoder 110 can be configured to categorize each layout component(s) as a discrete variable and map them to vector(s) of continuous numbers (e.g., an embedding). The encoder 110 can be a neural network (e.g., deep-learning, a two-dimensional (2D) convolutional neural network (CNN), LSTM, Transformer, etc.) trained (e.g., pretrained) to generate the embeddings including being trained (e.g., pretrained) to identify the layout component(s), categorize the identified layout component(s) and generate the embedding based on the categorized, identified layout component(s). Training the neural network (of the encoder 110) can include using images with labeled (and, therefore, identified) layout component(s). Thus, the training may include using a supervised learning technique.

The decoder 115 can be configured to map the vectors of continuous numbers (e.g., vector(s) or embeddings generated by the encoder 110) to a sequence of discrete variables. A discrete variable can be a variable whose value is obtained by counting. There is a fixed number of layout components associated with the document 105, and each component may be associated with (or identified by) a discrete variable. Therefore, the sequence of discrete variables can represent the initial sequence of the layout component(s). The sequence of discrete variables can include information representing the layout (e.g., of the document) and an index of the layout component(s). In other words, the discrete variables can represent the layout component(s) and the sequence represents information about the order of the layout components. Initially the sequential order may be a random order. The sequence of discrete variables is the output of the decoder 115. The index of any particular layout component represents the position of that component in the reading order. The output of the decoder can be referred to as a predicted reading order.

The sequencer 120 can be configured to generate an ordered sequence as the reading order 130 based on a vector(s). For example, each vector (of the embedding) can represent a plurality of features associated with a layout component. The elements of the vector can represent the probability that the layout component is the next layout component in the reading order. The element of the vector with the largest or maximum value can represent the next layout component in the ordered sequence.

The sequencer 120 may perform an iterative analysis of the layout components (e.g., the embedding) to identify the ordered sequence, e.g., the output sequence. An initial analysis of the vectors can identify the first layout component in the reading order, a second analysis of the remaining vectors can identify the second layout component, and so forth until all vectors in the embedding have been analyzed. After a layout component is selected for the ordered sequence, the attention function 125 can be a self-attention function. The attention function 125 can be configured to prevent positions in a sequence from attending to subsequent positions in the sequence. This masking can ensure that the predictions for position i can depend only on the known outputs at positions less than i. The attention function 125 can attenuate the summed features or each feature of the corresponding vector. For example, the attention function 125 can set the summed feature or each feature of the corresponding vector to a predetermined value (e.g., −1, 0, 1). Accordingly, a summed feature representing the selected layout component should not be a summed feature with the largest or maximum value. A stop token vector can be used to end the analysis. For example, a stop token value can be added to the vectors in the embedding and if the vector being analyzed has a value equal to the stop token value, the sequencer 120 can cause the analysis to end. The above-described loop is represented by the line and arrow from the attention function 125 block to the decoder 115 block. The attention function 125 block can use the vectors in the embedding as the basis for attenuating components or summed components. This stop token vector is represented by the line and arrow from the encoder 110 block to the attention function 125.

In some implementations, the decoder 115, sequencer 120, and the attention function 125 can be implemented as a single process operating together. Therefore, reference to the decoder 115 can infer the inclusion of the sequencer 120 and the attention function 125.

In example implementations, neural networks can be used as (or as an element of) an encoder (e.g., encoder 110) and/or a decoder (e.g., decoder 115). The neural network can be a recurrent neural network (RNN). The neural network can be an encoding RNN that converts the input sequence to a code that is fed to a first layer of the RNN (sometimes called the generating network). At each step, the RNN can produce a vector that modulates a content-based attention mechanism over inputs. The content-based attention mechanism can be configured to create vectors based on the similarity between features of the input (e.g., one of the layout components) and features stored in memory (e.g., associated with previously processed layout components).

Example implementations can use a softmax function (or normalized exponential function). The softmax function can be used to normalize the output of a network to a probability distribution over predicted output classes or categories. The output of the softmax function can be used to represent a class or categorical distribution. The output of the content-based attention mechanism (e.g., a feature of the vector) can be a softmax distribution with a dictionary size equal to the length of the input. The softmax distribution can be based on a function configured to generate weights for values associated with (e.g., in a distributed manner) the feature(s) of the vector. The content-based attention mechanism can be an interface connecting the encoder and decoder. The interface can be configured to provide the decoder with information from encoder hidden state(s). A hidden state or output can be produced for each layout component in the input sequence (e.g., the sequence that is not in the reading order). A hidden state can be inputs generated using data from previous time steps (e.g., input to processing of previous layout component in the input sequence).

With this framework, the model can selectively focus on valuable parts of the input sequence. In other words, the content-based attention mechanism can selectively process relevant features (e.g., features of the layout component), while ignoring others. The content-based attention mechanism can be an attention mechanism based on cosine similarity. In machine learning, cosine similarity can be a measurement that quantifies a similarity between two or more vectors (as discussed above a vector can represent a layout component). The cosine similarity can be the cosine of the angle between vectors. Mathematically, cosine similarity can be described as the division between the dot product of vectors and the product of the Euclidean norms or magnitude of each vector.

Mathematically, the SoftMax function (e.g., as described above, a function configured to generate weights) can take as input a vector z of K real numbers and normalize the vector into a probability distribution consisting of K probabilities that are proportional to the exponentials of the input numbers. The encoder/decoder described in FIG. 2A can be an example of an attention encoder (e.g., encoder 110) and/or attention decoder (e.g., decoder 115).

Figure 2A:
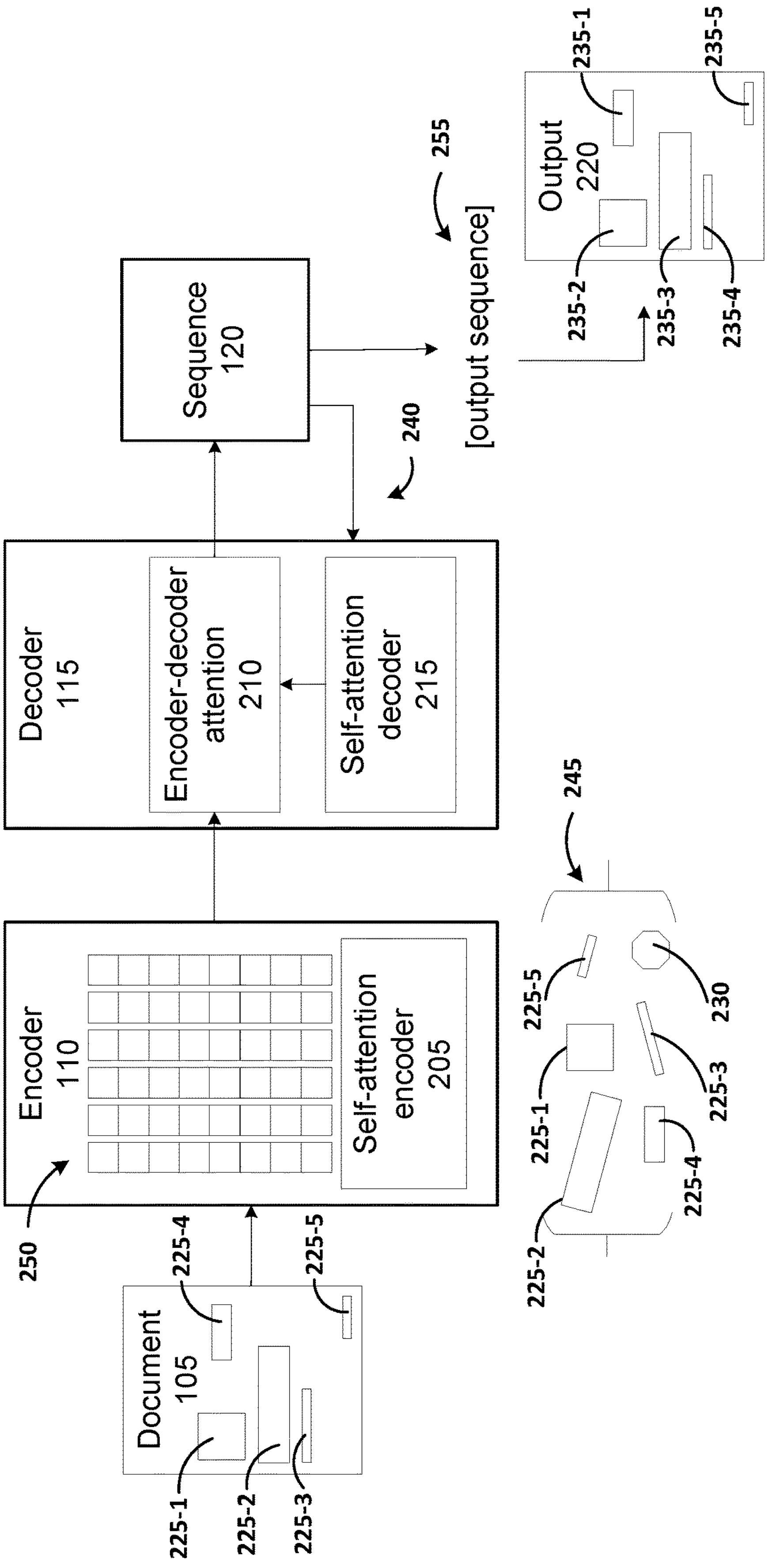
FIG. 2A illustrates a data flow block diagram according to an example implementation.

FIG. 2A illustrates a data flow block diagram according to an example implementation. As shown in FIG. 2A, the data flow includes the document 105 block, the encoder 110 block, the decoder 115 block, the sequencer 120 block, and an output 220 block. The document 105 includes layout components 225-1, 225-2, 225-3, 225-4, and 225-5. The document 105 is input to the encoder 110 (e.g., as an image). The layout components 225-1, 225-2, 225-3, 225-4, and 225-5 are also shown in a random order in bracket 245 together with a stop token 230.

The encoder 110 includes a self-attention encoder 205 block. The self-attention encoder 205 can be configured to generate an embedding including a random order of the layout components 225-1, 225-2, 225-3, 225-4, 225-5, and the stop token 230 included in bracket 245. Therefore, each vector in the embedding 250 represents one of the layout components 225-1, 225-2, 225-3, 225-4, 225-5, and the stop token 230 included in bracket 245.

The self-attention encoder 205 can be a self-attention module that weights the relationships between every pair of elements in the sequence and produces a high-dimensional embedding for every element in the input, e.g., the unordered layout components within bracket 245. Each embedding can be used as the Query and Key inputs to the encoder-decoder attention 210 included in the decoder 115. The self-attention encoder 205 can automatically learn to discover the influence of each element in the input on the other elements. This is advantageous because using the self-attention encoder 205 can create richer representations than using other encoder/decoder algorithms used for sequence-to-sequence learning (e.g., long short-term memory (LSTM)).

The decoder 115 includes a self-attention decoder 215 block. The self-attention decoder 215 can operate in a loop, sequentially producing each element of the output. The output at time T can be based on the input at time T-1. For example, the self-attention decoder 215 can auto-regressively predict pointers to the inputs (e.g., the index of the elements in the input sequence). In some implementations, the output elements can correspond to positions (e.g., an index) in an input sequence rather than using attention alone on the output of the encoder 110 to generate a reading order. The self-attention decoder 215 can be configured to apply attention (e.g., using a pointer network) over the input elements to pick one as the output at each decoder step (or iteration). The element picked at each decoder step can be the predicted (e.g., auto-regressively predicted) pointer. Auto-regressively predicted pointers can be modeled as a logit distribution. Line and arrow 240 represent that the decoder can operate as a loop operating on the embedding (e.g., vectors) until the vector corresponding to the stop token 230 is reached. In other words, stop token 230 can be added to the embedding 250 (as illustrated in bracket 245) and when, during the loop, the stop token is processed or operated on, the loop ends and decoder 115 has completed processing. During the loop, if the stop token 230 is the vector with the maximum value, all vectors (e.g., layout components) have been processed and the loop can end.

One or more (or each) layer of the decoder 215 can be a query (or matrix), keys, values, (or tokens) (QKV) outer product between the encoder inputs and the existing decoder elements as Q· K the existing decoder V elements, producing a matrix of size|decoder inputs|×|encoder inputs|, whose rows can be thought of as logits over the encoder input identifiers (IDs), and thus can be regularized with any loss used for classification. The sequencer 120 can use, for example, the function argmax( ) to determine the index (e.g., pointer) to the next element. The sequencer 120 can start with a single-element sequence consisting of an auxiliary start-of-sequence token and auto-regressively predicts each new pointer given the previous elements until a pointer to another additional token (e.g., the stop token 230 or stop-of-sequence) is produced.

The output of the sequencer 120 can generate each element of the output sequence 255 during each loop represented by line and arrow 240. The output sequence 255 can represent the reading order upon completion of the loop. The iteration of the loop is described below with regard to FIG. 2B. The output 220 shows the document 105 with each layout component 235-1, 235-2, 235-3, 235-4, and 235-5 in reading order. In other words, the first layout component predicted to be read can be layout component 235-1 and the last layout component predicted to be read can be layout component 235-5. Referring again to FIG. 7, the dotted line 720 in image 705-1-2 can pictorially represent the reading order from start S to end E based on an associated output sequence.

Figure 2B:
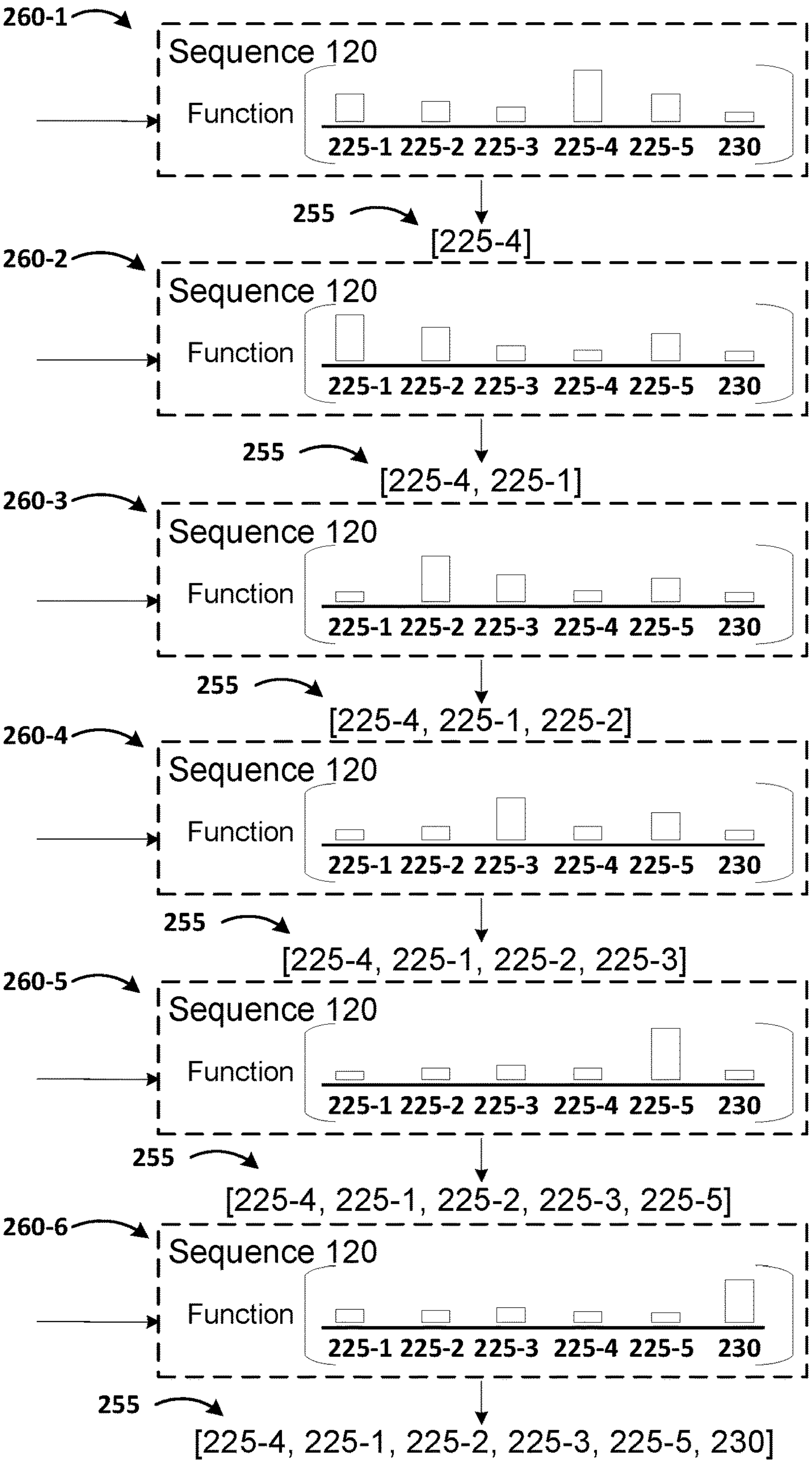
FIG. 2B illustrates a block diagram of a sequence loop according to an example implementation.

FIG. 2B illustrates a block diagram of a sequence loop and its output according to an example implementation. The sequence loop can be the functional part of executing the data flow of FIG. 2A, e.g., the loop represented by line and arrow 240. As mentioned above, the sequencer 120 can use, for example, the function argmax( ) to determine the index (e.g., pointer) to the next element based on, for example, a vector sum of the features representing a layout component. Using the function argmax( ) can result in the vector with the maximum value being the next element which is output to the output sequence 255. For example, each vector represents the likelihood of each layout component being the next, at a particular step in time. Each element of the vector can be a numeric value(s) representing the likelihood of the corresponding layout to be the next in the output order. The element of the vector (e.g., representing a layout component) with the largest value can be (e.g., predicted as) the next layout component in the reading order.

In iteration 260-1, the function (e.g., argmax( ) of the sequencer 120 is executed with the vector having the maximum value being the vector associated with layout component 225-4. Therefore, the sequencer 120 outputs the next element as layout component 225-4 which is added to the output sequence 255 (in iteration 260-1, the output sequence contains only the component 225-4). In iteration 260-2, the function of the sequencer 120 is executed with the vector having the maximum value being the vector associated with layout component 225-1. Therefore, the sequencer 120 outputs the next element, layout component 225-1, adding it to the output sequence 255, e.g., after component 225-4. In iteration 260-3, the function of the sequencer 120 is executed with the vector having the maximum value being the vector associated with layout component 225-2. Therefore, the sequencer 120 outputs layout component 225-2 as the next element, adding it to the output sequence 255 after component 225-1.

In iteration 260-4, the function of the sequencer 120 is executed with the vector having the maximum value being the vector associated with layout component 225-3. Therefore, the sequencer 120 outputs layout component 225-3 as the next element in the output sequence 255. In iteration 260-5, the function of the sequencer 120 is executed with the vector having the maximum value being the vector associated with layout component 225-5. Therefore, the sequencer 120 outputs the layout component 225-5 as the next element in the output sequence 255. In iteration 260-6, the function of the sequencer 120 is executed with the vector having the maximum value being the vector associated with the stop token 230. Therefore, the sequencer 120 outputs the stop token 230 as the next element in the output sequence 255. As discussed above, each vector of the embedding can represent a respective layout component. Generating these vectors can be described with regard to FIG. 3.

Figure 3:
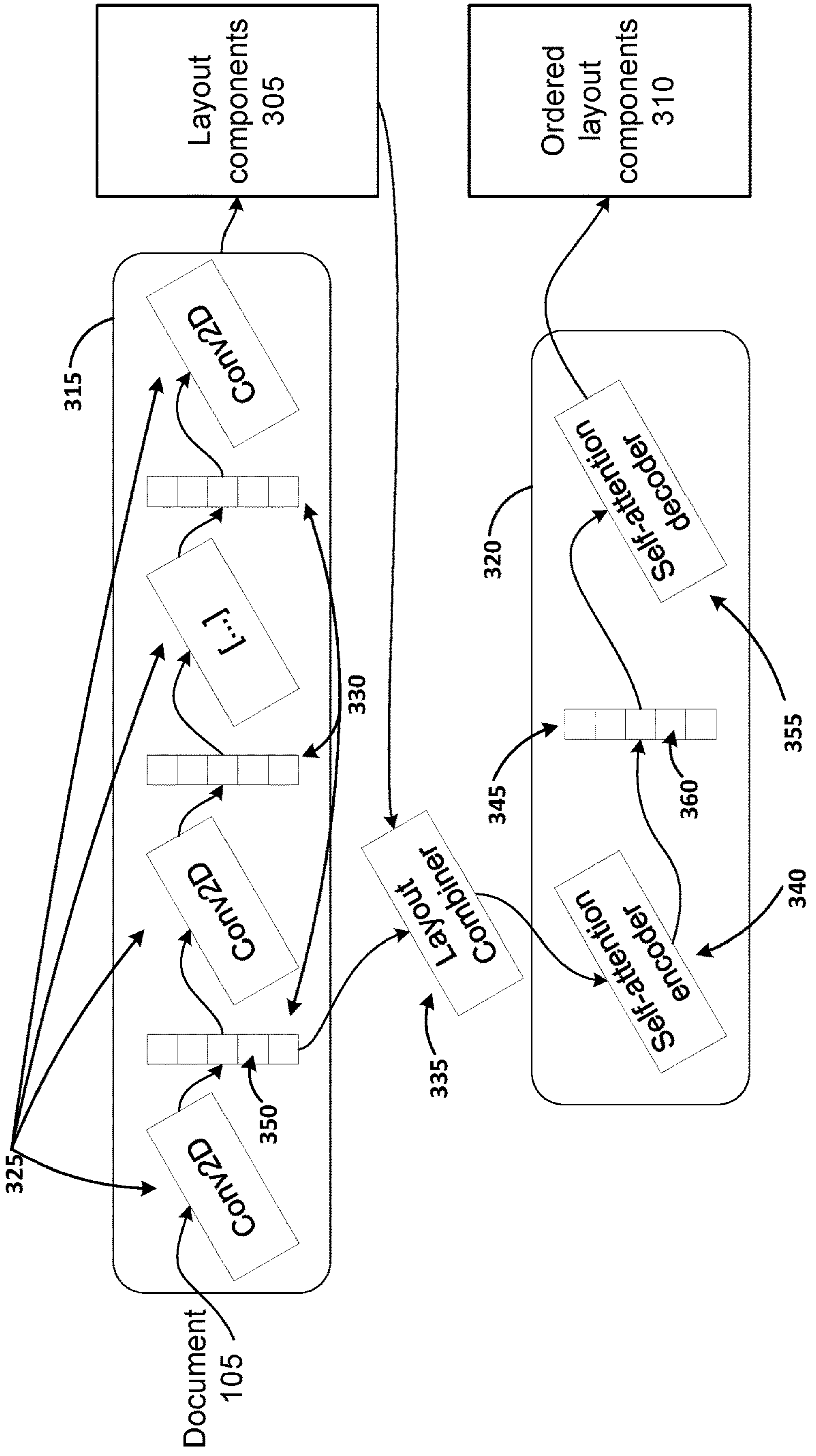
FIG. 3 illustrates a data flow block diagram according to an example implementation.

FIG. 3 illustrates a data flow block diagram according to an example implementation. As shown in FIG. 3, the data flow includes the document 105 (as input), layout components 305, ordered layout components 310, a component model 315 block, and a reading order 320 model block. The component model 315 can be configured to take the document 105 as input to identify at least one layout component (e.g., paragraphs, summaries, text, images, and/or the like) as layout components 305. Layout components 305 can be strung or linked together with an embedding 330 (e.g., an initial or first embedding) using a layout combiner 335 block which is then input to the reading order model 320 to predict (or generate) the ordered layout components 310.

The component model 315 can be configured to identify at least one component (e.g., paragraphs, summaries, text, images, and/or the like) based on an input image (e.g., document 105). The component model 315 can include a neural network, for example, at least one convolution 325 block, or convolution operation. The convolution 325 can be a two-dimensional (2D) convolution operation because a 2D convolution (e.g., CNN) can be effective at capturing image information across multiple scales. The convolution 325 can be configured to generate an embedding 330 including a plurality of vectors 350. The number of vectors 350 can be based on a number of layout components associated with (e.g., identified in) document 105. Thus, each vector can correspond to a respective layout component. Although corresponding to a respective layout component, each vector 350 can include information (e.g., features) associated with at least one other layout component as well. In other words, each successive convolution 325 can generate an information influence between components in a vector. For example, each vector 350 can include information about its respective component and adjacent components after each successive convolution 325. This information influence can help in predicting the reading order.

A convolution 325 can be configured to extract features from an image representing the document 105. Features can be based on layout components (e.g., paragraphs, titles, summaries, images, and the like), location of the components, size of the components, color, white space (no components), position of components relative to other components, and/or the like. The features can be represented using numeric values. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channel is combined into a feature map having a single depth or channel. A filter can be a 3×3 filter with a stride of 1 which results in an output with fewer cells in/for each channel of the M×M grid or feature map. The output can have the same depth or number of channels (e.g., a 3×3×n filter, where n=depth or number of channels, sometimes called a depthwise filter) or a reduced depth or number of channels (e.g., a 3×3×k filter, where k<depth or number of channels). Each channel, depth, or feature map can have an associated filter. Each associated filter can be configured to emphasize different aspects of a channel. In other words, different features can be extracted from each channel based on the filter (this is sometimes called a depthwise separable filter). The filter (sometimes called kernel or mask) can have a weight or weights. The weights can be modified or learned during a training operation, e.g., during training of the component model 315. In other words, in a ML model (e.g., CNN, RNN, and the like) the weights associated with the filter (kernel or mask) can be modified during a training operation. Other filters are within the scope of this disclosure.

Another type of convolution can be a combination of two or more convolutions, sometimes called a blended convolution. For example, a convolution can be a depthwise and pointwise separable convolution. This can include, for example, a convolution in two steps. The first step can be a depthwise convolution (e.g., a 3×3 convolution). The second step can be a pointwise convolution (e.g., a 1×1 convolution). The depthwise and pointwise convolution can be a separable convolution in that a different filter (e.g., filters to extract different features) can be used for each channel or each depth of a feature map. In some implementations, a first type of convolution can be used to extract text whereas a second type of convolution can be used to extract pictures. The convolution can be (or be an element of) a combination of a recurrent neural network and a recursive neural network. The recurrent neural network can be configured to extract information from an image by processing regions of the image. The recursive neural network can be configured to process object (e.g., layout components) relationships within a scene (e.g., the document 105 can be, can include, or can be considered a scene).

A convolution can be linear. A linear convolution describes the output, in terms of the input, as being linear time-invariant (LTI). Convolutions can also include a rectified linear unit (ReLU). A ReLU is an activation function that rectifies the LTI output of a convolution and limits the rectified output to a maximum. A ReLU can be used to accelerate convergence (e.g., result in more efficient training of the model).

Training the component model 315 can include modifying weights associated with convolution 325 (e.g., configuring the filter(s)). The component model 315 can be trained (e.g., pretrained) for distinguishing between layout components and identifying relationships between layout components. Although three convolutions 325 are illustrated, example implementations can include using four or more than four additional convolutions 325.

Each convolution 325 in the component model 315 can have an associated weight. The associated weights can be randomly initialized and then revised in each training iteration (e.g., epoch). The training can be associated with implementing (or helping to implement) distinguishing between layout components and identifying relationships between layout components. In an example implementation, a labeled input image (e.g., document 105 with labels indicating a preferred reading order) and the predicted reading order can be compared. A loss can be generated based on the difference between the labeled reading order and the predicted reading order. Training iterations can continue until the loss is minimized and/or until loss does not change significantly from iteration to iteration. In an example implementation, the lower the loss, the better the predicted reading order.

The component model 315 can be configured to generate an embedding of layout components 305. The embedding of layout components 305 can have the same structure as an embedding 330. The layout combiner 335 can be configured to concatenate at least one of embedding 330 with layout components 305. For example, the first of embedding 330 is illustrated by layout combiner 335 as being concatenated with layout components 305. Concatenating embedding 330 with layout components 305 can cause an emphasis of the information associated with (e.g., associated with each vector of) the embedding 330.

The output of the layout combiner 335 is the input to the reading order model 320 and a self-attention encoder 340 as an element of the reading order model 320. The self-attention encoder 340 can be configured to generate a context embedding 345, which is input to a self-attention decoder 355 as an element of the reading order model 320. The self-attention decoder 355 can be configured to generate a reading order, as ordered layout components 310, based on the context embedding 345. The context embedding 345 can include a plurality of vectors 360. The number of vectors 360 can be based on a number of layout components associated with (e.g., identified in) document 105. Each vector 360 can include information associated with each layout component. Each vector 360 can include a plurality of values (e.g., integer values) that can be, for example, summed.

The self-attention encoder 340 can be composed of a stack of, for example, N=6 identical layers. Each layer can have two sub-layers. The first sub-layer can be a multi-head self-attention mechanism, and the second sub-layer can be a position-wise fully connected feed-forward network. A residual connection can be applied around each of the two sub-layers, followed by layer normalization. In other words, the output of each sub-layer can be LayerNorm(x+Sublayer(x)), where Sublayer(x) is the function implemented by the sub-layer. To facilitate these residual connections, all sub-layers in the model, as well as the embedding layers, produce outputs of dimension, for example, dmodel=512. Hyperparameters can be obtained, for example, through cross-validation.

The self-attention decoder 355 can also be composed of a stack of, for example, N=6 identical layers. In addition to the two sub-layers in each encoder layer, the decoder can insert a third sub-layer. The third sub-layer can be configured to perform multi-head attention over the output of the encoder stack. Similar to the encoder, residual connections can be applied around each of the sub-layers, followed by layer normalization. The self-attention can be modified in the sub-layer in the decoder stack to prevent positions from attending to subsequent positions. This masking, combined with output embeddings being offset by one position can ensure that the predictions for position i can depend only on the known outputs at positions less than i. In other words, predicting the ordered layout components 310 based on the context embedding 345 (e.g., the plurality of vectors 360) can be based on previously predicted vectors 360 (e.g., corresponding to a layout component). For example, referring to FIG. 2B, iteration 260-3 can be influenced by the result (e.g., layout components 225-4, 225-1) of iteration 260-1 and 260-2. Further, the result of iteration 260-3 may not be influenced by the remaining layout components or the layout components that have not been added to the output sequence 255 (e.g., layout components 225-3, 225-5).

An attention function can be described as mapping a query and a set of key-value pairs to an output, where the query, keys, values, and output can all be vectors. In encoder-decoder attention layers, the queries can come from the previous decoder layer, and the memory keys and values can come from the output of the encoder. This can allow every position in the decoder to attend over all positions in the input sequence. The output can be computed as a weighted sum of the values, where the weight assigned to each value is computed by a compatibility function of the query with the corresponding key. Self-attention, sometimes called intra-attention is an attention mechanism relating different positions of a single sequence in order to compute a representation of the sequence.

The encoder can include self-attention layers. In a self-attention layer all of the keys, values and queries can come from the same place, in this case, the output of the previous layer in the encoder. Each position in the encoder can attend to all positions in the previous layer of the encoder. Similarly, self-attention layers in the decoder can allow each position in the decoder to attend to all positions in the decoder up to and including that position.

Figure 4:
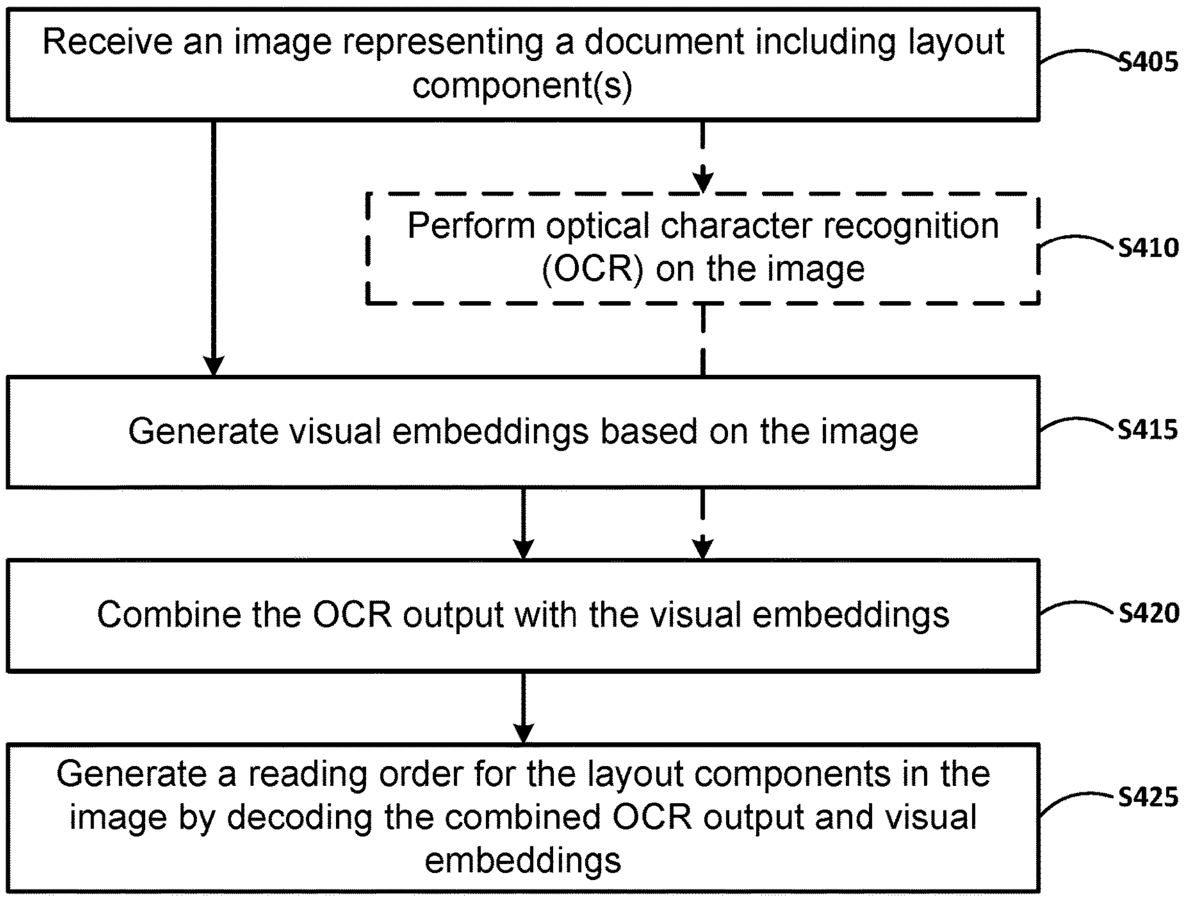
FIG. 4 illustrates a block diagram of a method for generating a reading order according to an example implementation.

FIG. 4 illustrates a block diagram of a method for generating a reading order according to an example implementation. As shown in FIG. 4, in step S405 an image representing a document including layout component(s) is received (e.g., received by the encoder 110, for example from a scanning unit, camera or storage medium). For example, the document (e.g., document 105) can include any readable document in the form of an image. The document can include at least one layout component (e.g., paragraphs, summaries, text, images, and/or the like). A reading order for the document can be desired. An example image representing the document can be image 705-1, 705-1-2 shown in FIG. 7.

In step S410, an optional step, optical character recognition (OCR) is performed on the image (e.g., for identifying and/or separating textual and visual information). For example, OCR can be the process (e.g., implemented by a computing device) of extracting data from a scanned document or image file and then converting the text into a machine-readable form, which can then be used for additional data processing. In an example implementation, OCR can be used to extract text-based data from the image. The text-based data can be extracted using a convolution. In other words, the OCR can be performed using machine learning. In some implementations the machine learning may include a neural network and/or a convolution operation (e.g., an 2D convolution operation). Therefore, the OCR can generate an embedding or text embedding including at least one array including text-based data associated with the layout components of the input image (e.g., representing a document). The text-based data of a vector can include data (e.g., numeric values) representing word similarity, related word grouping, text classification or features, document clustering (e.g., location within a document), natural language, and/or the like. For example, referring to FIG. 3, the component model 315 can be configured to use convolution 325 to perform, at least, the OCR process on document 105. As discussed above, component model 315 can be configured to identify at least one layout component (e.g., paragraphs, summaries, text, images, and/or the like). In addition, if at least one layout component includes an image including text, the component model 315 can be configured to perform an OCR operation on the text. For example, one or more of the plurality of vectors 350 of embedding 330 can include OCR'd text.

In step S415 a visual embedding is generated based on the image. For example, the visual embedding can include at least one array including data or visual data (e.g., information and/or features associated with an image) associated with the layout components of the input image (e.g., representing a document). Visual data can include location in the document and relationship to text (e.g., a header associated with the image). Visual data can include color, type of image (e.g., thumbnail, heading, and/or the like), content of the image (e.g., human, car, graph, and/or the like), and/or the like. In example implementations, layout component(s) (e.g., sequenced in a random order) associated with the image can be identified and encoded as the visual embedding. In other words, information associated with the layout component(s) can be stored in a data structure and labeled such that the layout component(s) are sequenced in a random order. The information and/or data structure can be encoded as an embedding. Therefore, the encoder 110 can be configured to generate an embedding including information (including the random order sequence) representing the layout component(s). For example, referring to FIG. 3, the component model 315 can be configured to use convolution

325 to generate a visual embedding(s) generated based on an image associated with document 105.

An embedding can be used to represent discrete variables as continuous vectors. In other words, an embedding can be a mapping of a discrete (e.g., categorical) variable to a vector of continuous numbers. The visual embedding can be generated using a neural network (e.g., deep-learning, a two-dimensional (2D) convolutional neural network (CNN)) trained (e.g., pretrained) to generate the embeddings including being trained (e.g., pretrained) to identify the layout component(s), categorize the identified layout component(s) and generate the embedding based on the categorized, identified layout component(s). Training the neural network can include using images with labelled (and, therefore, identified) layout component(s). The training may include using a supervised learning technique.

In step S420 the OCR output, if performed, is combined with the visual embedding. For example, as mentioned above, the OCR can generate an embedding that includes at least one array including text-based data associated with the layout components of the input image (e.g., representing a document). The OCR generated embedding can have the same structure as the visual embedding. Therefore, combining the OCR output with the visual embedding can generate an embedding including textual information and visual information associated with the layout components. Combining can include concatenating the textual information (e.g., array elements) with the visual information (e.g., array elements). For example, referring to FIG. 3, the layout combiner 335 can combine the text embedding and the visual embedding.

In step S425 a reading order is generated (i.e., predicted) for the layout components in the image by decoding the combined OCR output and visual embedding. For example, the combined OCR output and visual embedding can be processed by a self-attention encoder. The self-attention encoder (e.g., self-attention encoder 205, 340) can be configured to generate a context embedding (e.g., context embedding 345). The generated context embedding can be processed by a self-attention decoder (e.g., self-attention decoder 215, 355). The self-attention decoder can be configured to generate the reading order, as ordered layout components, based on the context embedding as described herein with regard to FIG. 3. Thus, the self-attention encoder can be self-attention encoder 340, the self-attention decoder can be self-attention decoder 355, and the embedding can be the context embedding 345.

Figure 5:
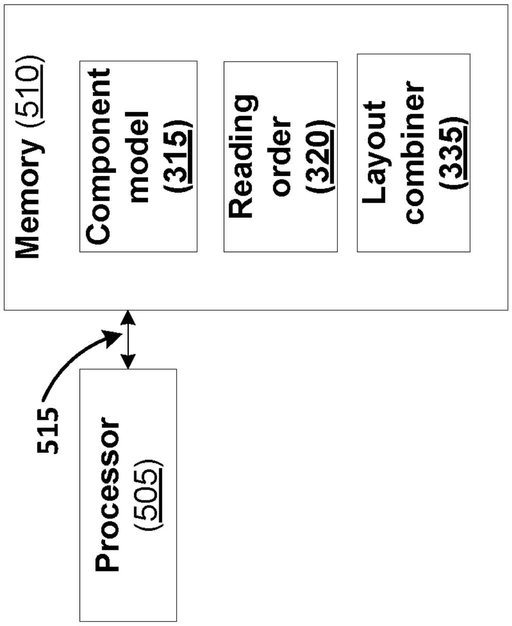
FIG. 5 illustrates a block diagram of a system according to an example implementation.

FIG. 5 illustrates a block diagram of a system according to an example implementation. In the example of FIG. 5, the system (e.g., an augmented reality system, a virtual reality system, and/or any system configured to read (e.g., text-to-voice, translate) a document) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 505 and a memory 510 (e.g., a non-transitory computer readable memory). The processor 505 and the memory 510 can be coupled (e.g., communicatively coupled) by a bus 515.

The processor 505 may be utilized to execute instructions stored on the at least one memory 510. Therefore, the processor 505 can implement the various features and functions described herein, or additional or alternative features and functions. The processor 505 and the at least one memory 510 may be utilized for various other purposes. For example, the at least one memory 510 may represent an example of various types of memory and related hardware and software which may be used to implement any one of the modules described herein.

The at least one memory 510 may be configured to store data and/or information associated with the device. The at least one memory 510 may be a shared resource. Therefore, the at least one memory 510 may be configured to store data and/or information associated with other elements (e.g., image/video processing or wired/wireless communication) within the larger system. Together, the processor 505 and the at least one memory 510 may be utilized to implement the techniques described herein. As such, the techniques described herein can be implemented as code segments (e.g., software) stored on the memory 510 and executed by the processor 505. Accordingly, the memory 510 can include the component model 315, the reading order model 320, and the layout combiner 335.

As discussed above, the component model 315 can be configured to use a document as input to identify at least one component (e.g., paragraphs, summaries, text, images, and/or the like) as layout components. The component model 315 can be configured to generate an embedding corresponding to textual information associated with the layout components and an embedding corresponding to visual information associated with the layout components. The layout combiner 335 can be configured to concatenate the embedding corresponding to textual information associated with the layout components with the embedding corresponding to visual information associated with the layout components. The reading order model 320 can be configured to predict (or generate) the ordered layout components based on the combined embeddings using a self-attention encoder/decoder.

Implementations can include one or more, and/or combinations thereof, of the following examples.

Example 1. A method including receiving an image representing a document including a plurality of layout components, identifying textual information associated with the plurality of layout components, identifying visual information associated with the plurality of layout components, combining the textual information with the visual information, and predicting a reading order of the plurality of layout components based on the combined textual information and visual information using a self-attention encoder/decoder.

Example 2. The method of Example 1, wherein the identifying of the textual information can include extracting text-based data from the image.

Example 3. The method of Example 2, wherein the extracting of the text-based data can include using a neural network configured to generate an embedding including the textual information.

Example 4. The method of Example 3, wherein the neural network can be a pretrained neural network that maps textual data to an embedding and an array can include an element including the text-based data associated with each layout component of the plurality of layout components.

Example 5. The method of any of Example 1 to Example 4, wherein the identifying of the visual information can include extracting visual-based data from the image.

Example 6. The method of Example 5, wherein the extracting of the visual-based data can include using a neural network configured to generate an embedding including the visual information.

Example 7. The method of Example 6, wherein the neural network can be a two-dimensional convolution operation, the embedding can include an array, and the array can include an element including the visual-based data associated with each of the plurality of layout components.

Example 8. The method of Example 6, wherein the neural network can include a plurality of two-dimensional convolution operations and the embedding can include an array including an element including the visual-based data associated with an associated layout component and the visual-based data associated with at least one additional layout component.

Example 9. The method of any of Example 1 to Example 8, wherein the textual information can be associated with a first embedding, the visual information can be associated with a second embedding, and the combining of the textual information with the visual information can include concatenating the first embedding with the second embedding.

Example 10. The method of any of Example 1 to Example 9, wherein the self-attention encoder/decoder can include a self-attention encoder configured to generate an embedding based on a first sequence associated with the plurality of layout components, the first sequence having a first order and a self-attention decoder configured to generate a second sequence based on the embedding, the second sequence having a second order.

Example 11. The method of any of Example 1 to Example 10, wherein the self-attention encoder/decoder can include a self-attention encoder configured to weight relationships between pairs of elements in a set and generate an embedding for the elements.

Example 12. The method of any of Example 1 to Example 11, wherein the self-attention encoder/decoder can include a self-attention encoder configured to determine an influence of each element in an embedding based on the combined textual information and visual information.

Example 13. The method of any of Example 1 to Example 12, wherein the self-attention encoder/decoder can include a self-attention decoder configured to operate as an auto-regressive inference.

Example 14. The method of any of Example 1 to Example 13, wherein the self-attention encoder/decoder can include a self-attention decoder configured to auto-regressively predict a next layout component in the reading order associated with the plurality of layout components.

Example 15. The method of any of Example 1 to Example 14, wherein the self-attention encoder/decoder can include a self-attention encoder and a self-attention decoder and the self-attention decoder can be configured to perform a QKV outer product between elements of the self-attention encoder and inputs to the self-attention decoder.

Example 16. A non-transitory computer-readable storage medium comprising instructions stored thereon that, when executed by at least one processor, are configured to cause a computing system to perform the method of any of Examples 1-15.

Example 17. An apparatus comprising means for performing the method of any of Examples 1-15.

Example 18. An apparatus comprising at least one processor and at least one memory including computer program code, the at least one memory and the computer program code configured to, with the at least one processor, cause the apparatus at least to perform the method of any of Examples 1-15.

Figure 6:
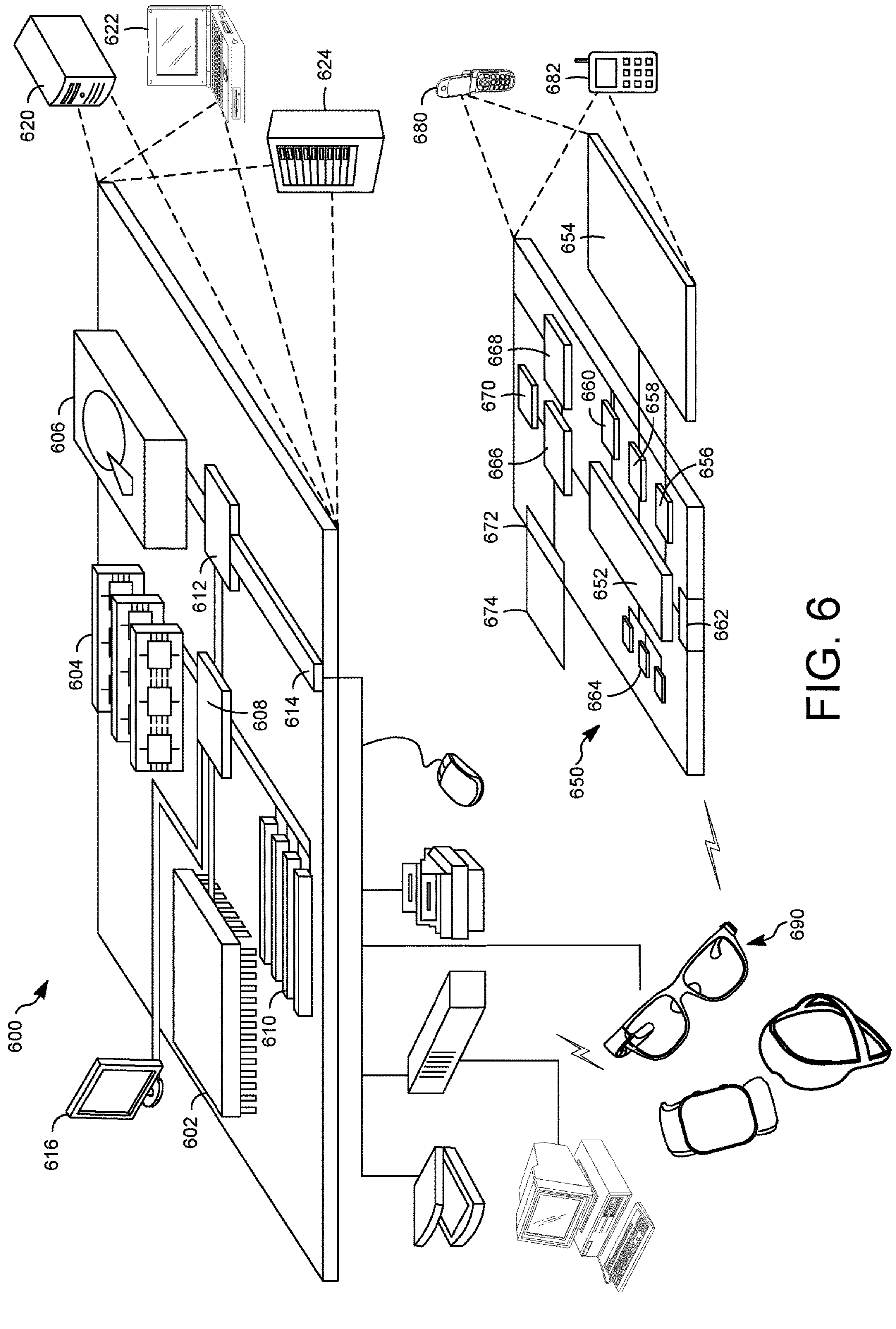
FIG. 6 shows an example of a computer device and a mobile computer device according to at least one example implementation.

FIG. 6 illustrates an example of a computer device 600 and a mobile computer device 650, which may be used with the techniques described. The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device

600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well: for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset/HMD device 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset/HMD device 690 for example, as movements on the rendered touchpad in the AR space. The rendered movements can control virtual objects in the AR space.

In some implementations, one or more output devices included on the computing device 650 can provide output and/or feedback to a user of the AR headset/HMD device 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset/HMD device 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:

receiving an image representing a document including a plurality of layout components;

identifying textual information associated with the plurality of layout components;

identifying visual information associated with the plurality of layout components;

combining the textual information with the visual information; and predicting a reading order of the plurality of layout components based on the combined textual information and visual information using:

a self-attention encoder configured to generate an embedding based on a first sequence associated with the plurality of layout components; and a self-attention decoder configured to generate a second sequence based on the embedding.

2. The method of claim 1, wherein the identifying of the textual information includes extracting text-based data from the image.

3. The method of claim 2, wherein the extracting of the text-based data includes using a neural network configured to generate an embedding representing the textual information.

4. The method of claim 3, wherein the neural network is a pretrained neural network that maps textual data to an embedding, and the embedding represents an element including the text-based data associated with a layout component of the plurality of layout components.

5. The method of claim 1, wherein the identifying of the visual information includes extracting visual-based data from the image.

6. The method of claim 5, wherein the extracting of the visual-based data includes using a neural network configured to generate an embedding including the visual information.

7. The method of claim 6, wherein the neural network includes a two-dimensional convolution operation, the embedding includes an array, and the array includes an element including the visual-based data associated with the plurality of layout components.

8. The method of claim 6, wherein the neural network includes a plurality of two-dimensional convolution operations, and the embedding includes an array including an element including the visual-based data associated with an associated layout component and the visual-based data associated with at least one additional layout component.

9. The method of claim 1, wherein the textual information is associated with a first embedding, the visual information is associated with a second embedding, and the combining of the textual information with the visual information includes concatenating the first embedding with the second embedding.

10. The method of claim 1, wherein the first sequence has a first order, and the second sequence has a second order different from the first order.

11. The method of claim 1, wherein the self-attention encoder is configured to:

weight relationships between pairs of elements in a set, and generate an embedding for the elements.

12. The method of claim 1, wherein the self-attention encoder is configured to determine an influence of an element in an embedding based on the combined textual information and visual information.

13. The method of claim 1, wherein the self-attention decoder is configured to operate as an auto-regressive inference.

14. The method of claim 1, wherein the self-attention decoder is configured to auto-regressively predict a next layout component in the reading order associated with the plurality of layout components.

15. The method of claim 1, wherein the self-attention decoder is configured to perform a QKV outer product between elements of the self-attention encoder and inputs to the self-attention decoder.

16. A non-transitory computer-readable storage medium comprising instructions stored thereon that, when executed by at least one processor, are configured to cause a computing system to:

receive an image representing a document including a plurality of layout components;

identify textual information associated with the plurality of layout components;

identify visual information associated with the plurality of layout components;

combine the textual information with the visual information; and predict a reading order of the plurality of layout components based on the combined textual information and visual information using:

a self-attention encoder configured to generate an embedding based on a first sequence associated with the plurality of layout components; and a self-attention decoder configured to generate a second sequence based on the embedding.

17. An apparatus comprising:

at least one processor; and at least one memory including computer program code;

the at least one memory and the computer program code configured to, with the at least one processor, cause the apparatus to:

receive an image representing a document including a plurality of layout components;

identify textual information associated with the plurality of layout components;

identify visual information associated with the plurality of layout components;

combine the textual information with the visual information; and predict a reading order of the plurality of layout components based on the combined textual information and visual information using:

a self-attention encoder configured to generate an embedding based on a first sequence associated with the plurality of layout components; and a self-attention decoder configured to generate a second sequence based on the embedding.

18. The non-transitory computer-readable storage medium of claim 16, wherein the identifying of the visual information includes extracting visual-based data from the image, the extracting of the visual-based data includes using a neural network configured to generate an embedding including the visual information, the neural network includes a two-dimensional convolution operation, the embedding includes an array, and the array includes an element including the visual-based data associated with the plurality of layout components.

19. The non-transitory computer-readable storage medium of claim 16, wherein the identifying of the visual information includes extracting visual-based data from the image, the extracting of the visual-based data includes using a neural network configured to generate an embedding including the visual information, the neural network includes a plurality of two-dimensional convolution operations, and the embedding includes an array including an element including the visual-based data associated with an associated layout component and the visual-based data associated with at least one additional layout component.

20. The non-transitory computer-readable storage medium of claim 16, wherein the textual information is associated with a first embedding, the visual information is associated with a second embedding, and the combining of the textual information with the visual information includes concatenating the first embedding with the second embedding.

* * * * *